L. C. CAISLEY.
ATTACHING MEANS FOR ANTISKID CHAINS.
APPLICATION FILED MAR. 20, 1920.

1,365,088.

Patented Jan. 11, 1921.

Inventor
Leslie C. Caisley,
By Chas. E. Bulkley,
Atty.

UNITED STATES PATENT OFFICE.

LESLIE C. CAISLEY, OF MORRIS, ILLINOIS.

ATTACHING MEANS FOR ANTISKID-CHAINS.

1,365,088.  Specification of Letters Patent.  Patented Jan. 11, 1921.

Application filed March 20, 1920. Serial No. 367,396.

*To all whom it may concern:*

Be it known that I, LESLIE C. CAISLEY, a citizen of the United States of America, and resident of Morris, Grundy county, Illinois, have invented a certain new and useful Improvement in Attaching Means for Antiskid-Chains, of which the following is a specification.

My invention relates to an improvement in attaching means for anti-skid chains, and has for its object the provision of a device which is simple and efficient in operation, and which is economical to manufacture, and one which enables the anti-skid chain to be quickly and readily attached and detached from the wheel.

These and other features and objects of my invention will be understood by having reference to the accompanying drawings in which I have illustrated one specific embodiment of my invention.

Figure 1:
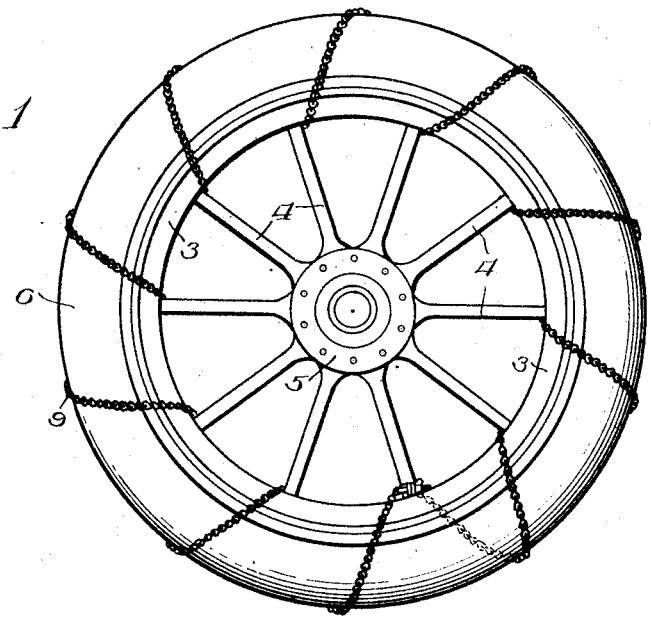
Figure 1 is a side elevation of a wheel showing the anti-skid chain attached thereto.
Figure 2:
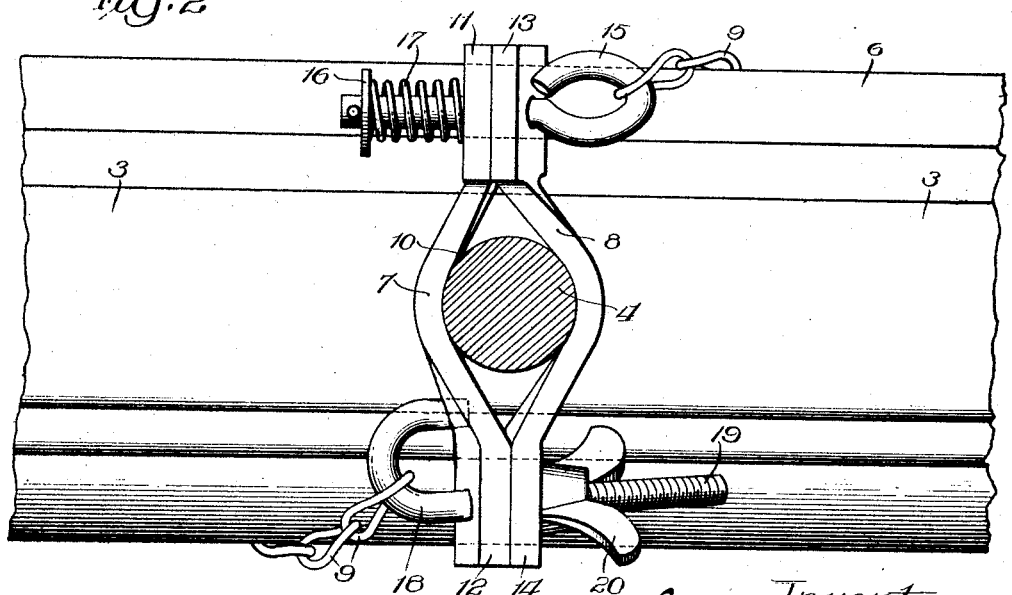
Fig. 2 is an enlarged detail view of the attaching clamp mounted on one of the spokes of the wheel, the spoke being shown in section.

As illustrated, I have shown a wheel 3 such as used on motor vehicles, having a plurality of spokes 4 secured to the hub 5, and upon this wheel is mounted a tire 6. Mounted upon one of the spokes 4 there is a clamping device consisting of the jaws 7 and 8, to which clamping device the opposite ends of the anti-skid chain 9 is secured. This chain consists of one long continuous member which is wrapped spirally about the felly of the wheel and tire, as indicated in Fig. 1, the chain being preferably wrapped around the tire as many times as there are spokes on the wheel, although, of course, the number of turns may be varied as desired. The clamping jaw 7 is provided with a curved central portion 10 to substantially fit the curvature of the spoke, and two flat end portions 11 and 12. The end portion 11 is bent so that the upper surface of this member extends slightly forward, as shown in Fig. 2, while the end extension 12 is bent in the opposite direction so that the upper face faces slightly to the rear. The clamping member 8 is likewise provided with end portions 13 and 14 which are bent to correspond with the ends 11 and 12 of the member 7. Passing through the end extensions 11 and 13 of the clamping members 7 and 8, there is an eye-bolt 15 provided with a head 16, and mounted between this head and the extension 11 is a spring 17. One link of the chain 9 is secured in the eye of this eye-bolt 15, as clearly shown in the drawings, the other end of this chain being secured to the hooked end 18 of a threaded bolt 19 which extends through the end extensions 12 and 14. Mounted upon the threaded bolt 19 there is a wing nut 20 which can be operated so as to draw one end of each of the clamping members together, and thus firmly clamp this member on the spoke.

It will thus be seen that I have devised a very simple and efficient clamping means for anti-skid chains, as in order to attach the chain to the tire it is but necessary to place the clamping device about one of the spokes and then wrap the chain spirally about the tire, and then loop one of the links at the opposite end of the chain through the hooked end 18 of the threaded bolt 19, and then by means of the wing nut 20 tighten the clamp on the spoke, at the same time closing the hook 18 so as to prevent the chain from becoming disengaged from this clamp. The spring 17 operates to permit sufficient movement of the eye-bolt 15 so as to relieve the tension on the chain to a sufficient degree to permit a limited amount of creeping of the chain, thus minimizing the wear on the tire. This resilient connection likewise prevents undue wear on the tire, due to excessive pressure by the chain against the tire.

While I have illustrated and described one specific embodiment of my invention, the scope of my invention is set forth in the appended claims.

What I claim as my invention is:

1. In a device of the class described, a wheel, an anti-skid chain having one end thereof secured to one of the spokes of said wheel and then wrapped spirally about said wheel, and means for attaching the opposite end of said chain to said spoke.

2. In a device of the class described, a wheel, a tire mounted thereon, a clamping device secured to one of the spokes of said wheel, and an anti-skid chain having one end thereof attached to the clamping device and then extending spirally around said wheel and having the opposite end of said chain likewise secured to said clamping device.

3. In a device of the class described, a wheel having a plurality of spokes, a tire mounted on said wheel, a clamping device secured to one of said spokes, an anti-skid chain wrapped spirally about said wheel, means for yieldingly attaching one end of said chain to said clamping device, and means for detachably securing the other end of said chain to said clamping device.

4. In a device of the class described, a wheel including a plurality of spokes, a tire mounted on said wheel, an anti-skid chain wrapped spirally about said wheel and tire, a clamping device mounted upon one of said spokes, said clamping device consisting of a pair of clamping jaws, a threaded bolt passing through one end of said jaws, a nut threaded upon said bolt for locking said jaws together to clamp the same on the spoke, and a spring pressed eye-bolt passing through the opposite ends of said jaws, one end of the chain being connected to the spring pressed eye-bolt and the other end to the end of said threaded bolt.

5. In a device of the class described, a wheel provided with a plurality of spokes, a tire mounted upon said wheel, an anti-skid chain wrapped spirally about said wheel, a clamping device mounted upon one of said spokes, said clamping device consisting of a pair of clamping jaws having oppositely extending engaging faces, an eye-bolt passing through a pair of said engaging extensions and provided with a spring for yieldingly holding said eye-bolt in position, one end of said chain being connected to said eye-bolt, a threaded bolt passing through the opposite extensions and provided with a hooked end to which the opposite end of the chain is attached, and a nut threaded upon said bolt for clamping said clamping device to the spoke.

Signed by me at Morris, Illinois, this 9 day of March, 1920.

LESLIE C. CAISLEY.